US008525818B2

(12) United States Patent
Yang et al.

(10) Patent No.: US 8,525,818 B2

(45) **Date of Patent: *Sep. 3, 2013**

(54) DISPLAY SYSTEM

(75) Inventors: Ssu-Chieh Yang, Tainan County (TW); Yaw-Guang Chang, Tainan County (TW); Hsien-Ting Huang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 236 days.

This patent is subject to a terminal disclaimer.

(21) Appl. No.: 12/719,873

(22) Filed: Mar. 9, 2010

(65) Prior Publication Data

US 2010/0164944 A1 Jul. 1, 2010

Related U.S. Application Data

(63) Continuation-in-part of application No. 12/370,585, filed on Feb. 12, 2009.

(60) Provisional application No. 61/109,193, filed on Oct. 29, 2008.

(51) Int. Cl.
*G06F 3/038* (2013.01)

(52) U.S. Cl.
USPC .............................. 345/208; 345/94; 345/102

(58) Field of Classification Search
USPC .............................. 345/87, 214, 94, 102, 208
See application file for complete search history.

(56) References Cited

U.S. PATENT DOCUMENTS

| | | | | |
|---|---|---|---|---|
| 6,862,015 | B2 | 3/2005 | Fujioka | |
| 7,110,274 | B1 | 9/2006 | Endo | |
| 7,167,154 | B2 | 1/2007 | Sato | |
| 7,212,182 | B2 * | 5/2007 | Chiang et | 345/92 |
| 2003/0011586 | A1 | 1/2003 | Nakajima | |
| 2005/0099374 | A1 * | 5/2005 | Sagawa | 345/87 |

(Continued)

FOREIGN PATENT DOCUMENTS

| | | | |
|---|---|---|---|
| CN | 1410813 | A | 4/2003 |
| CN | 1419733 | A | 5/2003 |

(Continued)

OTHER PUBLICATIONS 1.5x/2x High-Efficiency White LED Charge Pumps, MAX1910/MAX1912 datasheet Rev 2, 2004 Maxim Integrated Products, MAXIM, Mar. 2004, pp. 1-11.

(Continued)

*Primary Examiner* — Joseph Feild
*Assistant Examiner* — Andrew Sasinowski
(74) *Attorney, Agent, or Firm* — Winston Hsu; Scott Margo

(57) ABSTRACT

A display system includes a display device, a driving circuit, a flexible printed circuit (FPC), a charge pump circuit and a control circuit. The driving circuit is disposed on the display device, and utilized for driving the display device. The FPC is externally coupled to the display device. The charge pump circuit is disposed on the FPC, and utilized for generating at least an output voltage to the driving circuit. The control circuit is disposed on the display device and coupled to the driving circuit, and utilized for generating a control signal to control the charge pump circuit. The charge pump circuit has a control pin coupled to the control circuit for receiving the control signal generated from the control circuit.

8 Claims, 2 Drawing Sheets

(56) References Cited

U.S. PATENT DOCUMENTS

| | | | | |
|---|---|---|---|---|
| 2006/0012585 | A1 * | 1/2006 | Schoofs et al. | 345/204 |
| 2007/0024564 | A1 | 2/2007 | Shimizu | |
| 2007/0132678 | A1 * | 6/2007 | Wei et al. | 345/82 |
| 2007/0229447 | A1 * | 10/2007 | Takahara et al. | 345/102 |
| 2008/0036752 | A1 * | 2/2008 | Diab et al. | 345/208 |
| 2008/0084410 | A1 | 4/2008 | Uehara | |

FOREIGN PATENT DOCUMENTS

| | | | |
|---|---|---|---|
| CN | 1664887 | A | 9/2005 |
| CN | 101064467 | A | 10/2007 |
| CN | 101136586 | A | 3/2008 |
| JP | 2004343893 | A | 12/2004 |
| JP | 2007233202 | A | 9/2007 |
| TW | 200424995 | | 11/2004 |
| TW | 200826052 | | 6/2008 |
| TW | 200837708 | | 9/2008 |

OTHER PUBLICATIONS

Dragan Maksimović et al., “Switched-Capacitor DC-DC Converters for Low-Power On-Chip Applications”, 1999 IEEE, Aug. 6, 1999, vol. 1, pp. 54-59.

Switched-Capacitor voltage Doublers, MAX1682/MAX1683 datasheet Rev 2, 2000 Maxim Integrated Products, MAXIM, Sep. 2000, pp. 1-8.

Switched-Capacitor voltage Inverters, MAX828/MAX829 datasheet Rev 3, 1999 Maxim Integrated Products, MAXIM, Sep. 1999, pp. 1-8.

* cited by examiner

DISPLAY SYSTEM

CROSS-REFERENCE TO RELATED APPLICATIONS

This application is a continuation-in-part of co-pending U.S. application Ser. No. 12/370,585, filed on Feb. 12, 2009, which claims the benefit of U.S. provisional application No. 61/109,193, filed on Oct. 29, 2008, the contents thereof being incorporated herein by reference.

BACKGROUND OF THE INVENTION

1. Field of the Invention

The present invention relates to a display system, and more particularly, to a display system disposing a charge pump circuit on a flexible printed circuit (FPC) externally coupled to its display device for improving its voltage converting efficiency.

2. Description of the Prior Art

A charge pump is a type of DC to DC converter that uses capacitors as energy storage elements to create either a higher or lower voltage power source. Charge pumps use some form of switching devices to control the connection of voltages to the capacitor. The charge pumps can also double voltages, triple voltages, halve voltages, invert voltages, fractionally multiply or scale voltages such as ×3/2, ×4/3, ×2/3, etc. and generate arbitrary voltages, depending on the controller and circuit topology. A traditional charge pump circuit includes a voltage source, one or more charge capacitances, a load capacitance, a number of circuit switches and a fixed-frequency clock used to control the circuit switches. Using a clock period as an example (e.g. a doubled two phase circuit), in the first half period, circuit switches are used to make a parallel connection between a voltage source and a charge capacitance so as to charge the charge capacitance to a voltage level; in the second half period, circuit switches are used to make a serial connection between the voltage source and the charge capacitance and a load capacitance. After a number of periods are repeated, the voltage difference between two sides of the load capacitance will be lifted up to a voltage level that is much higher than that of the original voltage source.

In traditional small-sized and medium-sized thin-film transistor liquid crystal display (TFT-LCD) devices, with the growing size of the screen, the current consumption is also growing. If the charge pump circuit is disposed in the driving circuit of the TFT-LCD device, its voltage converting efficiency will get worse due to being limited by the indium tin oxide (ITO) resistors.

In addition, since the system end hopes to provide an input voltage ranging from 2.0V to 4.8V to the driving circuit of the TFT-LCD device directly, the charge pump circuit should be able to support a voltage converting ratio with different multiples (such as 1.5 times, 2 times, or 3 times) to provide the desired output voltage. Therefore, an important research and development subject in the industry is how to dispose a charge pump circuit in the TFT-LCD device without it being affected by the ITO resistors, and how to control the charge pump circuit.

SUMMARY OF THE INVENTION

It is therefore one of the objectives of the claimed invention to provide a display system disposing a charge pump circuit on a flexible printed circuit (FPC) externally coupled to its display device to solve the abovementioned problems.

According to an exemplary embodiment, a display system is provided. The exemplary display system includes a display device, a driving circuit, an FPC, a charge pump circuit and a control circuit. The driving circuit is disposed on the display device, for driving the display device. The FPC is externally coupled to the display device. The charge pump circuit is disposed on the FPC, for generating at least an output voltage to the driving circuit. The control circuit is disposed on the display device and coupled to the driving circuit, for generating a control signal to control the charge pump circuit. The charge pump circuit has a control pin coupled to the control circuit for receiving the control signal generated from the control circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
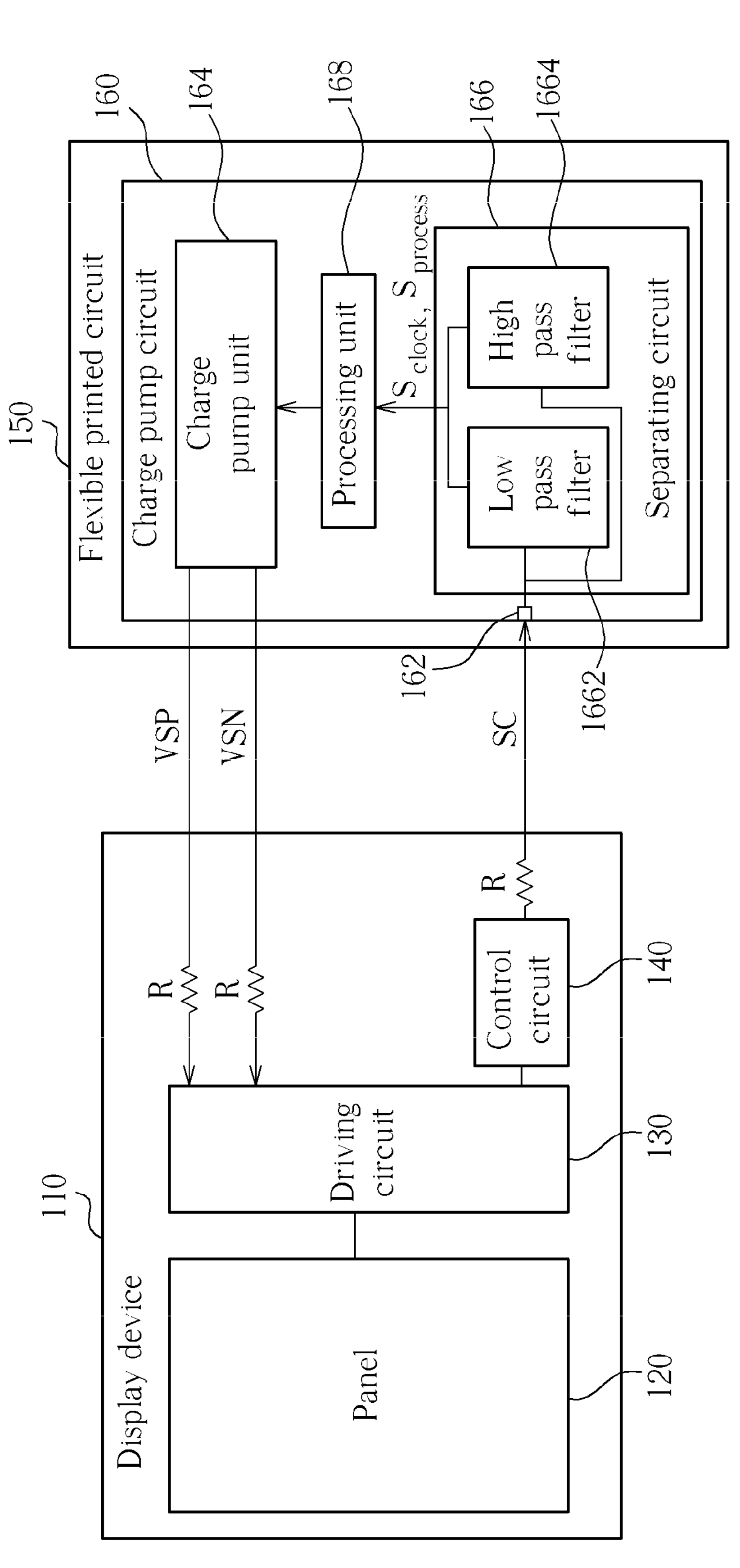
FIG. 1 is a diagram of a display system according to an exemplary embodiment of the present invention.

In a case where the charge pump circuit is moved from the driving circuit of the thin-film transistor liquid crystal display (TFT-LCD) device to a flexible printed circuit (FPC), it is necessary to consider how to control operations of the charge pump circuit disposed on the FPC. Please refer to FIG. 1. FIG. 1 is a diagram of a display system 100 according to an exemplary embodiment of the present invention. The display system 100 includes, but is not limited to, a display device 110, a panel 120, a driving circuit 130, a control circuit 140, a flexible printed circuit 150, and a charge pump circuit 160. The panel 120 is disposed on the display device 110. The driving circuit 130 is disposed on the display device 110 for driving the panel 120. The control circuit 140 is also disposed on the display device 110 and coupled to the driving circuit 130, for generating a control signal SC to control the charge pump circuit 160. The flexible printed circuit 150 is externally coupled to the display device 110. The charge pump circuit 160 is disposed on the flexible printed circuit 150 for generating at least an output voltage to the driving circuit 130 according to the control signal SC generated by the control circuit 140.

In this exemplary embodiment, the charge pump circuit 160 includes a control pin 162, a charge pump unit 164, a separating circuit 166 and a processing unit 168. As shown in FIG. 1, the control pin 162 is coupled to the control circuit 140 for receiving the control signal SC generated from the control circuit 140. In other words, there is only one control signal allowed to be transmitted from the control circuit 140 to the charge pump circuit 160 due to the fact that the charge pump circuit 150 is only equipped with a single pin for receiving one control signal. The charge pump unit 164 is used for generating at least the output voltage to the driving circuit 130. The separating circuit 166 is coupled to the control pin 162, for deriving a clock signal $S_{clock}$ and a process signal $S_{process}$ from the received control signal SC, wherein the process signal $S_{process}$ can be a data signal $S_{data}$ or a command signal $S_{command}$. The processing unit 168 is coupled between the separating circuit 166 and the charge pump unit 164, for receiving the clock signal $S_{clock}$ and the process signal $S_{process}$ generated from the separating circuit 166 and controlling the charge pump unit 164 according to the clock signal $S_{clock}$ and the process signal $S_{process}$. The charge pump circuit 160 sets a pumping factor PF1 and generates two output voltages VSP and VSN according to the control signal SC, wherein the output voltages VSP and VSN are transmitted to the driving circuit 130 for usage.

In addition, the separating circuit 166 in this embodiment includes a low pass filter 1662 and a high pass filter 1664. The low pass filter 1662 is coupled to the control pin 162, for filtering the control signal SC to generate the clock signal $S_{clock}$. The high pass filter 1664 is coupled to the control pin 162, for filtering the control signal SC to generate the process signal $S_{process}$. Please note that, in this embodiment, the separating circuit 166 utilizes two filters to derive the clock signal $S_{clock}$ and the process signal $S_{process}$ from the control signal SC, but this should not be taken as a limitation of the present invention. In other words, the separating circuit 166 can derive the clock signal $S_{clock}$ and the process signal $S_{process}$ by utilizing other kinds of circuits, depending upon the actual design considerations. Operations of the control circuit 140 and the charge pump circuit 160 will be detailed using certain figures and embodiments.

Figure 2:
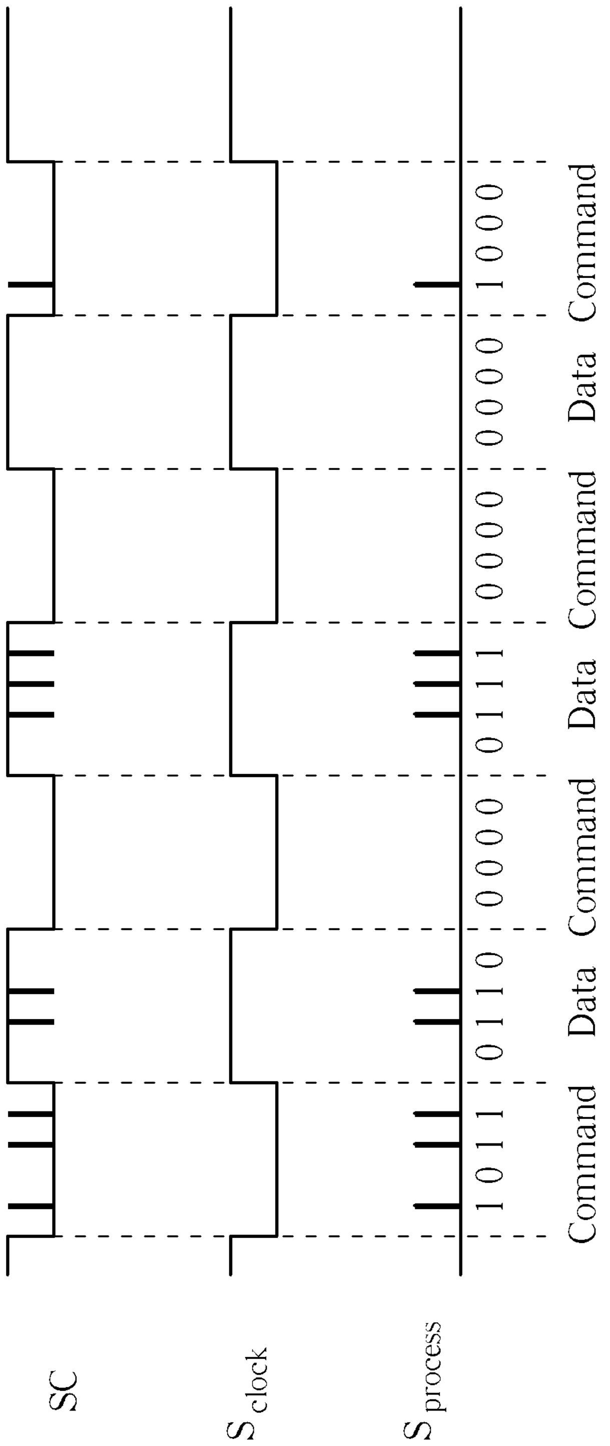
FIG. 2 is a timing diagram illustrating a control signal, a clock signal and a process signal, respectively.

Please note that, for clarity and simplicity, this embodiment of the present invention will be described in detail with reference to the accompanying drawings. It is to be noted, however, that the present invention is not limited thereto. Please refer to FIG. 2 in conjunction with FIG. 1. FIG. 2 is a timing diagram illustrating a control signal SC, a clock signal $S_{clock}$ and a process signal $S_{process}$, respectively. The control circuit 140 generates the control signal SC to control the charge pump circuit 160 according to the requirements of the driving circuit 130. In this embodiment, the control circuit 140 combines the process signal $S_{process}$ transmitted with a high frequency and the clock signal $S_{clock}$ transmitted with a related low frequency into the control signal SC as shown in FIG. 2. However, the present invention is not limited thereto.

The separating circuit 166 of the charge pump circuit 160 receives the control signal SC via the control pin 162. The low pass filter 1662 and the high pass filter 1664 filter the received control signal SC to generate the clock signal $S_{clock}$ and the process signal $S_{process}$ shown in FIG. 2, respectively. Then, the high pass filter 1664 of the separating circuit 166 selectively generates the data signals $S_{data}$ or the command signals $S_{command}$ according to a carrier position of a high-frequency signal component of the control signal SC. For example, the high-frequency signal component of the control signal SC positioned at the high frequency of the clock signal $S_{clock}$ is regarded as the data signal $S_{data}$ (e.g., the logic value "0110" shown in FIG. 2); the high-frequency signal component of the control signal SC positioned at the low frequency of the clock signal $S_{clock}$ is regarded as the command signal $S_{command}$ (e.g., the logic value "1011" shown in FIG. 2). The charge pump circuit 160 can set the pumping factor PF1 and generate the two output voltages VSP and VSN according to the clock signal $S_{clock}$ and the process signal $S_{process}$. For example, in this embodiment, the charge pump circuit 160 sets the pumping factor PF1 to 3/2 according to the command signal $S_{command}$ with logic value "1011".

As can be seen from FIG. 1, the charge pump circuit 160 is disposed on the flexible printed circuit 150, rather than being disposed in the driving circuit 130 of the display device 110. Therefore, the voltage converting efficiency of the charge pump circuit 160 can be substantially improved due to its not being limited by the indium tin oxide (ITO) resistors R. Furthermore, only one control signal SC is needed to control the voltage converting ratio of the charge pump circuit 160, which minimizes the pin number (pin count) of the charge pump circuit 160 to achieve a goal of lowering cost. Please note that the abovementioned display device 110 can be a TFT-LCD device and the driving circuit 130 can be a TFT-LCD driver IC, but this should not be construed as a limitation of the present invention. Besides, all of the devices implemented in the charge pump circuit 160 can be integrated in a single IC (e.g., System-on-a-chip, SoC), therefore, the charge pump unit 164 can supply an output voltage more precisely.

The abovementioned embodiments are presented merely for describing features of the present invention, and in no way should be considered to be limitations of the scope of the present invention. In summary, the present invention provides a display system disposing a charge pump circuit on an FPC externally coupled to its display device for improving its voltage converting efficiency. The display system of the present invention utilizes a single control pin and a control signal to control the charge pump circuit disposed on the FPC. Therefore, the voltage converting efficiency of the charge pump circuit in this display system will not be limited by the indium tin oxide (ITO) resistors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:

a display device, which comprises indium tin oxide (ITO) resistors;

a driving circuit, disposed on the display device, for driving the display device;

a flexible printed circuit (FPC), externally coupled to the display device;

a charge pump circuit, disposed only on the FPC, for generating at least an output voltage to the driving circuit; and a control circuit, disposed on the display device and coupled to the driving circuit, for generating a control signal to control the charge pump circuit;

wherein the charge pump circuit has a control pin coupled to the control circuit for receiving the control signal generated from the control circuit; and the charge pump circuit is disposed only on the FPC and is coupled to each of the driving circuit and the control circuit through the FPC without being directly connected to any of the driving circuit and the control circuit, so as to prevent a voltage converting efficiency of the charge pump circuit from being limited by the ITO resistors of the display device.

2. The display system of claim 1, wherein the charge pump circuit comprises:

a charge pump unit, for generating at least the output voltage to the driving circuit;

a separating circuit, coupled to the control pin, for deriving a clock signal and a data/command signal from the control signal; and a processing unit, coupled to the separating circuit and the charge pump unit, for receiving the clock signal and the data/command signal generated from the separating circuit and controlling the charge pump unit according to the clock signal and the data/command signal.

3. The display system of claim 2, wherein the separating circuit filters the control signal to generate the clock signal and the data/command signal.

4. The display system of claim 3, wherein the separating circuit comprises:

a low pass filter, coupled to the control pin, for filtering the control signal to generate the clock signal; and a high pass filter, coupled to the control pin, for filtering the control signal to generate the data/command signal.

5. The display system of claim 4, wherein the high pass filter selectively generates the data signal or the command signal according to a carrier position of a high-frequency signal component of the control signal.

6. The display system of claim 1, wherein the charge pump circuit comprises:

a charge pump unit, for generating at least the output voltage to the driving circuit;

a separating circuit, coupled to the control pin, for deriving a plurality of driving signals from the control signal; and a processing unit, coupled to the separating circuit and the charge pump unit, for receiving the driving signals generated from the separating circuit and controlling the charge pump unit according to the driving signals.

7. The display system of claim 6, wherein the separating circuit filters the control signal to generate the driving signals.

8. The display system of claim 1, wherein the display device is a thin-film transistor liquid crystal display (TFT-LCD) device, and the driving circuit is a TFT-LCD driver IC.

* * * * *